US009853307B2

(12) United States Patent
Lai et al.

(10) Patent No.: US 9,853,307 B2
(45) Date of Patent: Dec. 26, 2017

(54) FUEL CELL STACK WITH IMPROVED END CELL PERFORMANCE PROVIDED BY HIGHER MODULUS OF ELASTICITY

(71) Applicant: GM GLOBAL TECHNOLOGY OPERATIONS LLC, Detroit, MI (US)

(72) Inventors: Yeh-Hung Lai, Webster, NY (US); Pinkhas A. Rapaport, Penfield, NY (US); Po-Ya Abel Chuang, West Lafayette, IN (US); Wenbin Gu, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 890 days.

(21) Appl. No.: 14/062,628

(22) Filed: Oct. 24, 2013

(65) Prior Publication Data
US 2014/0051004 A1 Feb. 20, 2014

Related U.S. Application Data

(62) Division of application No. 11/757,843, filed on Jun. 4, 2007, now abandoned.

(51) Int. Cl.
*H01M 8/04082* (2016.01)
*H01M 8/023* (2016.01)

(52) U.S. Cl.
CPC ....... *H01M 8/04201* (2013.01); *H01M 8/023* (2013.01)

(58) Field of Classification Search
CPC ............ H01M 8/023–8/0234; H01M 8/04291; H01M 8/04201
See application file for complete search history.

(56) References Cited

U.S. PATENT DOCUMENTS 3,727,240 A 4/1973 Child
6,866,954 B2 3/2005 Hayashi
(Continued)

FOREIGN PATENT DOCUMENTS

WO WO 2006075681 A1 * 7/2006 .......... H01M 4/8636

OTHER PUBLICATIONS

Morgan et al. "Reinforcement with Fluoroplastic Additives". retrieved from http://www2.dupont.com/Teflon_Industrial/en_US/products/product_by_name/zonyl_techinfo_reinforce.html on Nov. 17, 2011.
(Continued)

*Primary Examiner* — Nicholas P D'Aniello
*Assistant Examiner* — Philip A Stuckey
(74) *Attorney, Agent, or Firm* — John A. Miller; Miller IP Group, PLC

(57) ABSTRACT

A fuel cell stack that includes a gas diffusion media for the end cells in the stack that has less of an intrusion into the flow field channels of the end cells that the other cells, so as to increase the flow rate through the flow channels in the end cells relative to the flow rate through the flow channels in the other cells. A different diffusion media can be used in the end cells than the nominal cells, where the end cell diffusion media has less of a channel intrusion as a result of diffusion media characteristics. Also, the same diffusion media could be used in the end cells as the nominal cells, but the end cell diffusion media layers could be thinner than the nominal cell diffusion media layers. Further, a higher amount of pre-compression can be used for the diffusion media in the end cells.

8 Claims, 2 Drawing Sheets

(56) References Cited

U.S. PATENT DOCUMENTS

| | | | |
|---|---|---|---|
| 7,632,589 B2 | 12/2009 | Kawashima | |
| 2005/0238943 A1* | 10/2005 | Akiyama | H01M 8/0245 |
| | | | 429/450 |
| 2007/0015042 A1* | 1/2007 | Ji | B32B 3/30 |
| | | | 429/509 |

OTHER PUBLICATIONS

Definition of composition retrieved from Dictionary.com on Nov. 17, 2011.

* cited by examiner

FUEL CELL STACK WITH IMPROVED END CELL PERFORMANCE PROVIDED BY HIGHER MODULUS OF ELASTICITY

CROSS-REFERENCE TO RELATED APPLICATIONS

This application is a Divisional application of U.S. patent application Ser. No. 11/757,843, filed Jun. 4, 2007, titled "Fuel Cell Stack With Improved End Cell Performance".

BACKGROUND OF THE INVENTION

Field of the Invention

This invention relates generally to a fuel cell stack having improved end cell performance and, more particularly, to a fuel cell stack having improved end cell performance by providing a diffusion media for the end cells that has less of an intrusion into the flow field channels than the diffusion media for the flow channels of the other cells so as to increase the flow rate through the flow channels in the end cells relative to the flow rate through the flow channels in the other cells.

Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA).

Several fuel cells are typically combined in a fuel cell stack to generate the desired power. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack. The stack also includes flow channels through which a cooling fluid flows.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The membrane within a fuel cell needs to have a certain relative humidity so that the ionic resistance across the membrane is low enough to effectively conduct protons. This humidification may come from the stack water by-product or external humidification. The flow of the reactant gas through the flow channels has a drying effect on the membrane, most noticeably at an inlet of the flow channels. Also, the accumulation of water droplets within the flow channels from the membrane hydration and water by-product could prevent reactant gas from flowing therethrough, and cause the cell to fail, thus affecting the stack stability. The accumulation of water in the reactant gas flow channels is particularly troublesome at low stack output loads.

The end cells in a fuel cell stack typically have a lower performance as a result of cell stability than the other cells in the stack. Particularly, the end cells are more exposed to ambient temperature, and thus have a temperature gradient that causes them to operate at a lower temperature as a result of convective heat losses. Because the end cells are typically cooler than the other cells in the stack, water vapor more easily condenses into liquid water so that the end cells have a higher relative humidity, which causes water droplets to more readily form in the flow channels of the end cells. Also, at low stack loads the temperature of the cooling fluid is reduced, which reduces the temperature of the stack and typically increases the relative humidity of the reactant gas flow.

End cell stability can be illustrated by the following example. A fuel cell stack may be operating at a certain current density, such as 0.6 $A/cm^2$, which provides a cell voltage of about 0.7 volts. The flow rate of reactant gas through the reactant gas flow channels to produce this current density is sufficient to force accumulated water in the flow channels out of the flow channels. If the current density of the stack is reduced to 0.1 $A/cm^2$, such as for vehicle idle, the cell voltage increases to about 0.85 volts, and the flow rate of reactant gas through the flow channels is significantly reduced. Because the end cells are at a lower temperature, more water will condense in the end cell flow channels increasing channel blockage. Because the channels may be blocked with water, the reactant gas may be diverted to the flow channels of other fuel cells, which causes the voltage of the end cells to become unstable.

It is known in the art to heat the end cells with resistive heaters positioned between the unipolar plate and the MEA so as to compensate for convective heat losses. These known systems typically attempted to maintain the end cell temperature the same as the other cells in the stack by monitoring the temperature of the cooling fluid out of the stack. However, end cell stability is still a problem even with the addition of such heaters.

SUMMARY OF THE INVENTION

In accordance with the teachings of the present invention, a fuel cell stack is disclosed that includes a gas diffusion media for the end cells in the stack that has less of an intrusion into the flow field channels of the end cells than the other cells, so as to increase the flow rate through the flow channels in the end cells relative to the flow rate through the flow channels in the other cells. A different diffusion media can be used in the end cells than the nominal cells, where the end cell diffusion media has less of a channel intrusion as a result of diffusion media characteristics, such as having a higher modulus of elasticity, a higher shear modulus, a lower compressibility, etc. Also, the same diffusion media could be used in the end cells as the nominal cells, but the end cell diffusion media layers could be thinner than the nominal cell diffusion media layers, which will provide a reduced flow channel intrusion. Further, a higher amount of pre-compression can be used for the diffusion media in the end cells.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a fuel cell stack including a gas diffusion media for the end cells in the stack that has a reduced intrusion into the flow field channels so as to increase the flow rate through the flow channels in the end cells relative to the flow rate through the flow channels in the other cells is merely exemplary in nature, and is in no way intended to limit the invention or its applications or uses.

Figure 1:
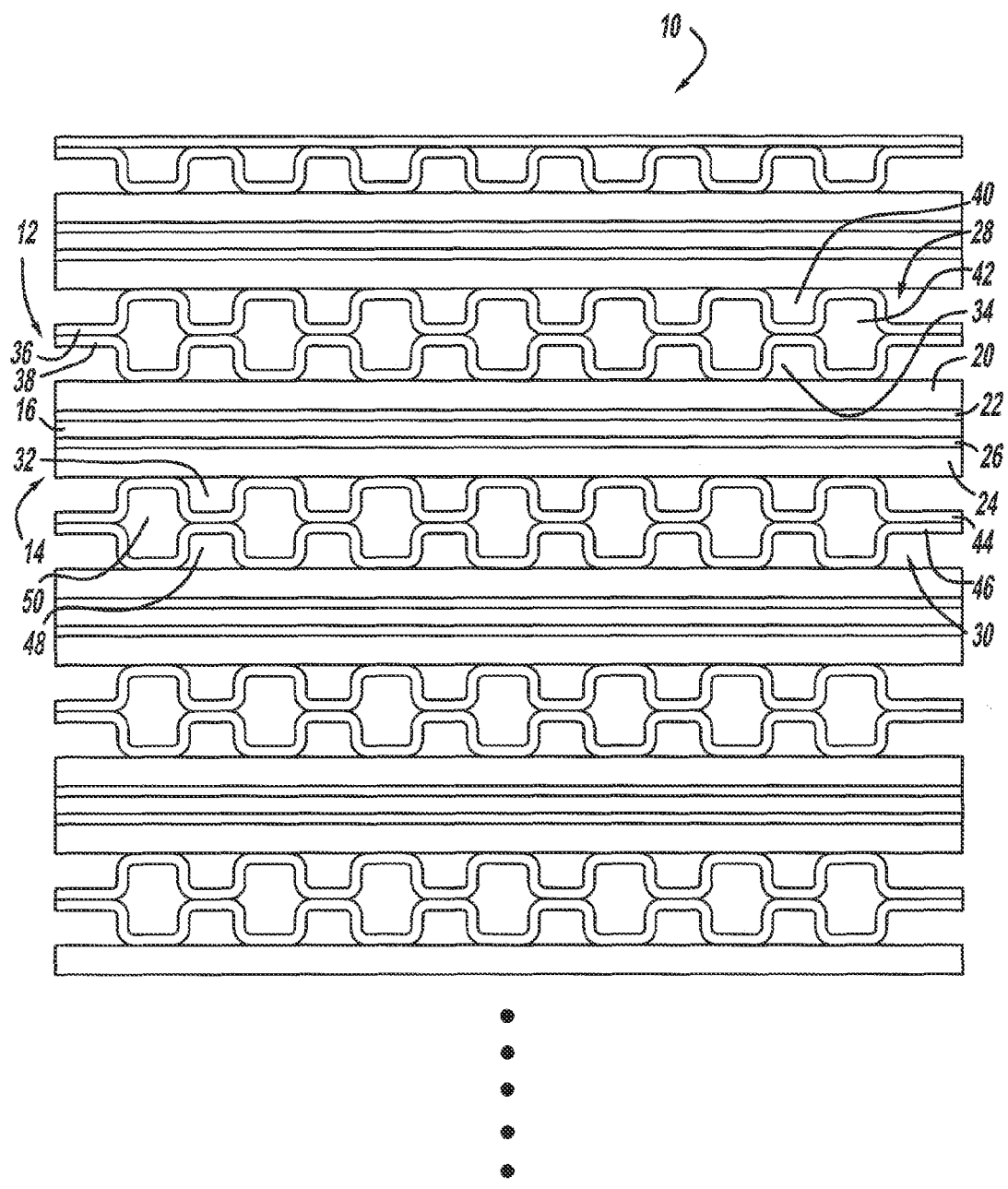
FIG. 1 is a cross-sectional view of a series of end cells in a fuel cell stack.

FIG. 1 is a cross-sectional view of a series of end cells 10 in a fuel cell stack of the type discussed above. The number of end cells that would benefit from the invention would depend on the certain stack design, and would typically be up to five fuel cells. Four of the end cells 10 are shown in FIG. 1. Each fuel cell 10 includes a cathode side 12 and an anode side 14 separated by a polymer electrolyte membrane 16. A cathode side diffusion media layer 20 is provided on the cathode side 12, and a cathode side catalyst layer 22 is provided between the membrane 16 and the diffusion media layer 20. Likewise, an anode side diffusion media layer 24 is provided on the anode side 14, and an anode side catalyst layer 26 is provided between the membrane 16 and the diffusion media layer 24. The catalyst layers 22 and 26 and the membrane 16 define an MEA. The diffusion media layers 20 and 24 are porous layers that provide for input gas transport to and water transport from the MEA. Various techniques are known in the art for depositing the catalyst layers 22 and 26 on the diffusion media layers 20 and 24, respectively, or on the membrane 16.

A cathode side flow field plate or bipolar plate 28 is provided on the cathode side 12 and an anode side flow field plate or bipolar plate 30 is provided on the anode side 14. The bipolar plates 28 and 30 are provided between the fuel cells in the fuel cell stack. A hydrogen reactant gas flow from flow channels 32 in the bipolar plate 30 reacts with the catalyst layer 26 to dissociate the hydrogen ions and the electrons. Reactant gas flow from flow channels 34 in the bipolar plate 28 reacts with the catalyst layer 22. The hydrogen ions are able to propagate through the membrane 16 where they carry the ionic current through the membrane 16. The end product is water, which does not have any negative impact on the environment.

In this non-limiting embodiment, the bipolar plate 28 includes two stamped metal sheets 36 and 38 that are welded together. The sheet 38 defines the flow channels 34 and the sheet 36 defines flow channels 40 for the anode side of an adjacent fuel cell to the fuel cell 10. Cooling fluid flow channels 42 are provided between the sheets 36 and 38, as shown. Likewise, the bipolar plate 30 includes a sheet 44 defining the flow channels 32, and a sheet 46 defining flow channels 48 for the cathode side of an adjacent fuel cell. Cooling fluid flow channels 50 are provided between the sheets 44 and 46, as shown. The bipolar plates 28 and 30 can be made of any suitable conductive material that can be stamped, such as stainless steel, titanium, aluminum, etc.

The present invention proposes a technique for increasing end cell performance and reducing end cell instability by reducing diffusion media intrusion into the flow channels in the end cells for one or both of the cathode and anode side of the fuel cell to increase the flow rate through the flow channels relative to the flow rate through the flow channels of the other cells. As is know in the art, because the diffusion media material is soft it partially enters the flow channels when the stack is assembled and the cells are compressed together, referred to in the industry as diffusion media intrusion. This flow channel intrusion by the diffusion media reduces the flow through the channel.

The present invention contemplates various techniques for reducing the diffusion media intrusion into the flow channels in the end cells so as to increase the flow rate of the reactant gas through the flow channels in the end cells relative to the flow rate of the reactant gas through the flow channels in the other or nominal cells. A different diffusion media can be used in the end cells than the nominal cells, where the end cell diffusion media has less of a channel intrusion as a result of diffusion media characteristics, such as having a higher modulus of elasticity, a higher shear modulus, a lower compressibility, etc. The modulus of elasticity can be determined by a three point bend test, the shear modulus can be determined by a transverse shear test and a compression test can be performed in the thickness direction. Also, the same diffusion media could be used in the end cells as the nominal cells, but the end cell diffusion media layers could be thinner than the nominal cell diffusion media layers, which will provide a reduced flow channel intrusion. Further, a higher amount of pre-compression can be used for the diffusion media in the end cells. It has previously been proposed in the art to compress the diffusion media before it is assembled in the stack to provide a better diffusion media layer thickness uniformity. The pre-compression refers to a procedure to compress the gas diffusion media in the thickness direction to achieve higher density. The method of pre-compression may include, but not be limited to, applying a uniform static or dynamic compressive load over the plane of the gas diffusion media and calendaring the gas diffusion media through the nips of calendar rollers.

A model based on the Hagan-Poiseuille equation for incompressible laminar flow and cylindrical conduit can be used to estimate the effect of the gas diffusion media intrusion into the flow field channels on flow distribution. This equation is given as:

$$-\frac{dp}{dx} = 32\frac{\mu U_{avg}}{D^2} \quad (1)$$

where P is the reactant pressure, μ is the reactant viscosity, D is the hydraulic diameter of the flow channel, and $\mu_{avg}$ is the average velocity of the gas flowing through the flow channel.

For sake of simplicity, it is assumed that a single channel represents each end cell. In the case of an uniform flow and pressure distribution in both the inlet and outlet manifolds, the fuel cell stack can be represented by a set of n parallel cells of the same length with some nominal hydraulic diameter D and nominal flow rate per channel Q. Therefore, all of the fuel cells will have the same pressure drop as:

$$\Delta P \sim \frac{Q}{D^4} \quad (2)$$

As a result of the reduced gas diffusion media intrusion into the flow field channels, the hydraulic diameter D in each of the m end cells increases by ΔD compared to the nominal cells. In this case, the flow through each of the end cells will increase by an amount of ΔQ. Because the system is maintaining a constant flow rate, the total amount of flow rate increase in the end cells (mΔQ) will be provided by the remaining n-m cells. Provided that the pressure drop in the nominal cells and the end cells is still equal, and the change in channel hydraulic diameter D of the end cells is relatively small, the following equation can be provided:

$$\frac{Q - m\Delta Q/(n-m)}{D^4} = \frac{Q + \Delta Q}{(D + \Delta D)^4} \quad (3)$$

Dividing equation (3) by $$\frac{Q}{D^4},$$

and substituting $$\delta = \frac{\Delta Q}{Q} \text{ and } \varepsilon = \frac{\Delta D}{D},$$

equation (3) can be rewritten in a dimensionless form as:

$$1 - \frac{m\delta}{(n-m)} = \frac{(1+\delta)}{(1+\varepsilon)^4} \quad (4)$$

Solving equation (4) for δ, the increased flow in the end cell can be obtained as a percentage to the nominally expected flow as:

$$\delta(n, \varepsilon) = \frac{(n-m)[(1+\varepsilon)^4 - 1]}{(n-m) + m(1+\varepsilon)^4} \quad (5)$$

Figure 2:
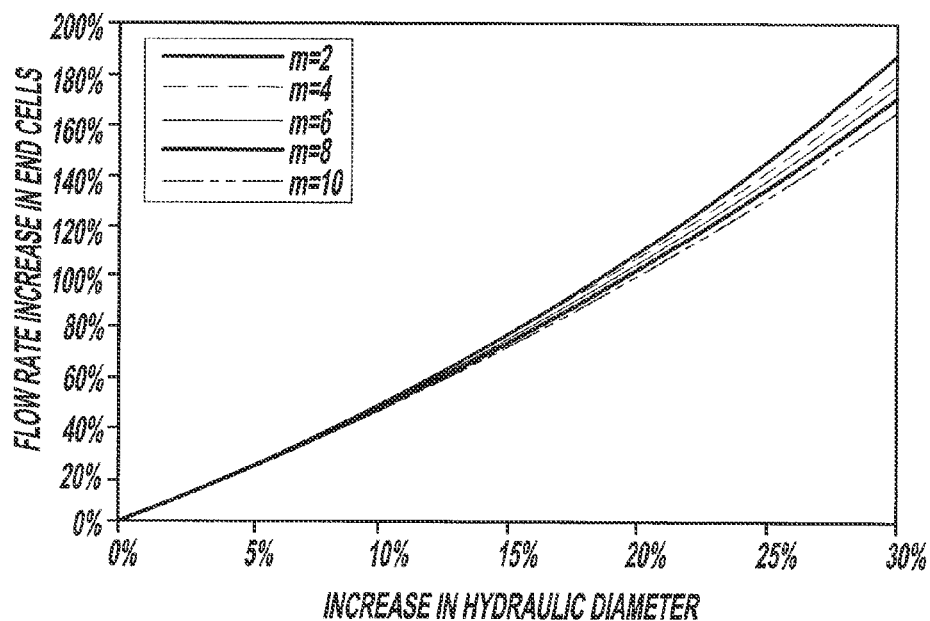
FIG. 2 is a graph with increase in hydraulic diameter on the horizontal axis and flow rate increase in end cells on the vertical axis showing an increase of reactant gas flow in the end cells of a fuel cell stack with various increases in hydraulic diameter.

Equation (5) is represented in FIG. 2 for a fuel cell stack having 200 cells. The increased flow in the end cells can be easily provided by the remaining 200-m cells, which results in a significant increase in the end cell flow rates. It has been discovered from this graph that a slight increase in hydraulic diameter D of 5% in the end cell can easily create a relatively large increase of 21% in the flow rate. Further, an increase in the hydraulic diameter D of 10% can provide a 46% increase in end-cell flow rate.

Using equation (5) and FIG. 2 for a flow field with a channel depth of 0.25 mm and a channel width of 1.0 mm using a SGL25BC gas diffusion media with a nominal gas diffusion media intrusion of 0.05 mm, it has been discovered that to achieve a flow rate increase of 20% would only require using a gas diffusion media having channel intrusions of 0.04 mm.

Figure 3:
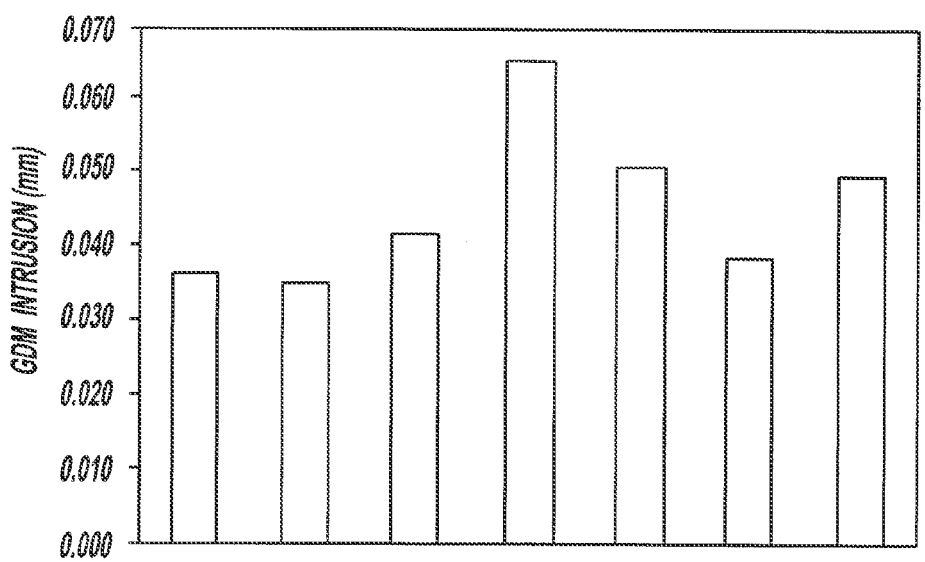
FIG. 3 is a graph with diffusion media material on the horizontal axis and diffusion media channel intrusion on the vertical axis.

FIG. 3 illustrates the gas diffusion media channel intrusion for various gas diffusion medias. Using this graph, a particular diffusion media can be selected to meet the desired flow characteristics based on the discussion above. In FIG. 3, the bars from left to right are represented by the following diffusion media materials in order.

Toray TGP-H-060
Toray TGP-H-090
SGL GDL 20BC
SGL GDL 21BC
SGL GDL 25BC
Mitsibushi Rayon MRC 105
Ballard AvCarb P50

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell stack comprising:
    a plurality of fuel cells including at least one end cell at each end of the fuel cell stack;
    a plurality of flow field plates separating the fuel cells in the fuel cell stack, said flow field plates including flow channels; and
    a plurality of diffusion media layers positioned adjacent to the flow field plates in the fuel cells, wherein diffusion media material of the diffusion media layers is selected so that the diffusion media material has a lower intrusion into the flow channels of the flow field plates in the at least one end cell at each end of the fuel cell stack than the intrusion into the flow channels of the flow field plates in fuel cells other than the at least one end cell at each end of the fuel cell stack, and
    wherein the diffusion media material of the diffusion media layers in the at least one end cell at each end of the fuel cell stack has a higher modulus of elasticity than a diffusion media material of the diffusion media layers in the fuel cells other than the at least one end cell at each end of the fuel cell stack; and
    wherein the diffusion media material of the diffusion media layers in the at least one end cell at each end of the fuel cell stack is different than the diffusion media material of the diffusion media layers in the fuel cells other than the at least one and cell at each end of the fuel cell stack.

2. The fuel cell stack according to claim 1 wherein the at least one end cell is five or less end cells at each end of the stack.

3. The fuel cell stack according to claim 1 wherein the diffusion media layers in the at least one end cell at each end of the fuel cell stack are thinner than the diffusion media layers in the fuel cells other than the at least one end cell at each end of the fuel cell stack.

4. A fuel cell stack comprising
a plurality of diffusion media layers positioned adjacent to flow field plates between fuel cells in the stack,
wherein diffusion media material of the diffusion media layers is selected so that the diffusion media material has a lower intrusion into the flow channels in the flow field plates in end cells of the fuel cell stack than the intrusion of the diffusion media material into the flow channels of the flow field plates of fuel cells other than the end cells, and
wherein the diffusion media material of the diffusion media layers in the end cells has a higher modulus of elasticity than a diffusion media material of the diffusion media layers in the fuel cells other than the end cells; and
wherein the diffusion media material of the diffusion media layers in the end cells is different than the diffusion media material of the diffusion media layers in the fuel cells other than the end cells.

5. The fuel cell stack according to claim 4 wherein the number of end cells is five or less end cells at each end of the stack.

6. A method for increasing the stability of end cells in the fuel cell stack of claim 1 comprising selecting the diffusion media for fuel cells in the fuel cell stack so that the intrusion of the diffusion media into flow channels in end cells is less than the intrusion of the diffusion media into flow channels of other fuel cells, wherein the diffusion media in the end cells has a higher modulus of elasticity than the diffusion media in the cells other than the end cells.

7. The method according to claim 6 wherein the diffusion media in the end cells is different than the diffusion media in the cells other than the end cells.

8. The method according to claim 6 wherein the diffusion media in the end cells is thinner than the diffusion media in the cells other than the end cells.

\* \* \* \* \*